United States Patent
Ishibashi et al.

(10) Patent No.: US 11,660,951 B2
(45) Date of Patent: May 30, 2023

(54) POWER SUPPLY DEVICE, VEHICLE EQUIPPED WITH SAME, AND ELECTRICITY STORAGE DEVICE

(71) Applicant: SANYO Electric Co., Ltd., Daito (JP)

(72) Inventors: Kengo Ishibashi, Hyogo (JP); Shininchi Mitsubori, Kanagawa (JP); Shinobu Terauchi, Hyogo (JP)

(73) Assignee: SANYO Electric Co., Ltd., Daito (JP)

(*) Notice: Subject to any disclaimer, the term of this patent is extended or adjusted under 35 U.S.C. 154(b) by 404 days.

(21) Appl. No.: 16/619,580

(22) PCT Filed: May 31, 2018

(86) PCT No.: PCT/JP2018/020880
§ 371 (c)(1),
(2) Date: Dec. 5, 2019

(87) PCT Pub. No.: WO2018/235556
PCT Pub. Date: Dec. 27, 2018

(65) Prior Publication Data
US 2020/0099027 A1 Mar. 26, 2020

(30) Foreign Application Priority Data
Jun. 22, 2017 (JP) .............................. JP2017-122649

(51) Int. Cl.
*B60K 6/28* (2007.10)
*H01M 10/46* (2006.01)
(Continued)

(52) U.S. Cl.
CPC ............... *B60K 6/28* (2013.01); *H01M 10/46* (2013.01); *H01M 50/209* (2021.01);
(Continued)

(58) Field of Classification Search
CPC ......... H01M 10/46; H01M 50/20–209; H01M 50/244–253; H01M 50/258–264; B60K 6/28
See application file for complete search history.

(56) References Cited

U.S. PATENT DOCUMENTS

| 5,766,801 A | 6/1998 | Inoue et al. |
| 2011/0151309 A1 | 6/2011 | Park et al. |

(Continued)

FOREIGN PATENT DOCUMENTS

| JP | H09-120808 A | 5/1997 |
| JP | 2006-185815 A | 7/2006 |

(Continued)

OTHER PUBLICATIONS

Translation of International Search Report dated Jul. 10, 2018, issued in counterpart Application No. PCT/JP2018/020880. (2 pages).

*Primary Examiner* — Matthew T Martin
*Assistant Examiner* — Katharine A Caughron
(74) *Attorney, Agent, or Firm* — WHDA, LLP

(57) ABSTRACT

A power supply device includes: a battery stack body that includes a plurality of secondary battery cells that are stacked; a pair of end plates disposed on both end surfaces of the battery stack body, respectively; and binding bars that are disposed on both the end surfaces of the battery stack body, respectively, and bind the pair of end plates. Each of the binding bars includes engaging steps that are opposite the pair of end plates, respectively. Each of the engaging steps extends in a direction intersecting with a stack direction of the battery stack body. Each of the pair of end plates includes engaging protrusions that are opposite the binding bars, respectively. The engaging protrusions engage with engaging steps. Consequently, rigidity that binds the battery (Continued)

stack body together is increased without changing a material and a thickness of the binding bars.

22 Claims, 14 Drawing Sheets

(51) Int. Cl.
  *H01M 50/209* (2021.01)
  *H01M 50/264* (2021.01)
  *H01M 50/103* (2021.01)
  *H01M 50/289* (2021.01)
(52) U.S. Cl.
  CPC ........ *H01M 50/264* (2021.01); *H01M 50/103* (2021.01); *H01M 50/289* (2021.01)

(56) References Cited

U.S. PATENT DOCUMENTS

| 2011/0183179 | A1 | 7/2011 | Okada |
| 2012/0115004 | A1 | 5/2012 | Park et al. |
| 2012/0141855 | A1 | 6/2012 | Okada et al. |
| 2014/0356683 | A1 | 12/2014 | Kim et al. |
| 2015/0144409 | A1 | 5/2015 | Fujii |
| 2016/0093844 | A1 | 3/2016 | Kamiya et al. |
| 2016/0149180 | A1 | 5/2016 | Tokoo et al. |
| 2016/0260946 | A1* | 9/2016 | Ochi ................. H01M 10/6557 |

FOREIGN PATENT DOCUMENTS

| JP | 2011-049181 A | | 3/2011 |
| JP | 2011-129509 A | | 6/2011 |
| JP | 2011-154985 A | | 8/2011 |
| JP | 2012-181970 A | | 9/2012 |
| JP | 2013-073917 A | | 4/2013 |
| JP | 2015-005362 A | | 1/2015 |
| JP | 2015-84331 A | | 4/2015 |
| JP | 2016-072107 A | | 5/2016 |
| JP | 2016091871 A | * | 5/2016 |
| JP | 2017-054866 A | | 3/2017 |
| WO | 2014/034079 A1 | | 3/2014 |

* cited by examiner

POWER SUPPLY DEVICE, VEHICLE EQUIPPED WITH SAME, AND ELECTRICITY STORAGE DEVICE

TECHNICAL FIELD

The present invention relates to a power supply device, and a vehicle and an electricity storage device that are equipped with the power supply device.

BACKGROUND ART

A power supply device that includes many secondary batteries connected with each other in series or in parallel is used to drive a vehicle, for example. FIG. 13 is an exploded perspective view that illustrates an example of such a power supply device. Power supply device 900 illustrated in FIG. 13 includes a plurality of secondary battery cells 901 and a plurality of spacers 902 that are alternately stacked. Secondary battery cells 901 are rectangular (prismatic). Power supply device 900 includes end plates 903 disposed on end surfaces, respectively, and binding bars 904 that bind secondary battery cells 901, spacers 902, and end plates 903 together. Spacers 902 are made of a hard resin.

It is known that secondary battery cells become swollen by being charged and discharged. Especially because high outputs of batteries have been demanded in recent years, capacities of secondary battery cells are increased. Consequently, an amount of expansion of secondary battery cells tends to increase. Therefore, rigidity of a force that binds a stack of secondary battery cells together needs to be increased.

As illustrated in FIG. 13, in a conventional configuration, both edges of binding bars 904 are each bent into a shape like a letter "L". The L-shaped portions 904b are fixed to main surfaces of end plates 903 with bolts 906. In the configuration, when battery stack body 1402 that is expanding applies a stress that pushes out end plates 1403, as illustrated in a horizontal cross-sectional view of FIG. 14, the stress concentrates on bent portions of binding bars 1404, as illustrated in circles drawn with a broken line in FIG. 14. Consequently, the bent edges of binding bars 1404 may open or may break. To solve the problems, a thickness of the binding bars may be increased, or the binding bars may be made of a more rigid material, and thus rigidity of the binding bars may be increased.

However, a large thickness of the binding bars increases a weight of the binding bars. Further, the more rigid material increases cost. Especially for power supply devices for vehicles, light weight is strongly demanded in view of improvement of fuel economy.

PRIOR ART DOCUMENTS

Patent Literature

PTL 1: Unexamined Japanese Patent Publication No. 2015-84331

SUMMARY OF THE INVENTION

The present invention is made in view of the above circumstances. It is an object of the present invention to provide a power supply device that has a sufficient force that binds secondary battery cells together, and a vehicle and an electricity storage device that are equipped with the power supply device.

A power supply device according to a first aspect of the present invention includes a battery stack body that includes a plurality of secondary battery cells that are stacked, a pair of end plates disposed on both end surfaces of the battery stack body, respectively, and binding bars that are disposed on side surfaces of the battery stack body, respectively, and bind the pair of end plates. Each of the binding bars includes engaging steps that are opposite the pair of end plates, respectively. Each of the engaging steps extends in a direction intersecting with a stack direction of the battery stack body. Each of the pair of end plates includes engaging protrusions that are opposite the binding bars, respectively. The engaging protrusions engage with the engaging steps. The above configuration increases rigidity that binds the battery stack body together. Further, a material and a thickness of the binding bars are not changed.

In a power supply device according to a second aspect of the present invention that includes the above configuration, each of the binding bars may include a pair of reinforcing members that are on a binding bar main surface that is opposite the battery stack body, and the pair of reinforcing members may protrude toward the mating end plates, and may include the respective engaging steps that engage with the engaging protrusions. According to the above configuration, a thickness of edges of the binding bars is easily ensured. The thickness allows the engaging steps to be formed. Further, a thickness of the binding bars themselves is not thick. Therefore, a manufacturing cost decreases.

In a power supply device according to a third aspect of the present invention that includes any one of the above configurations, each of the binding bars may include a metal plate and a pair of metal blocks, and each of the pair of metal blocks has a dimension in the direction intersecting with the stack direction of the battery stack body that is larger than a dimension of the metal plate in the direction intersecting with the stack direction of the battery stack body, and the pair of metal blocks may be the pair of reinforcing members, and the pair of metal blocks and the metal plate may be integrally formed.

In a power supply device according to a fourth aspect of the present invention that includes any one of the above configurations, fixing structures that screw the binding bars to the end plates may be arranged at connection structures that include the engaging steps and the engaging protrusions. The above configuration adds the fixing structures that screw the binding bars to the end plates to positions where the engaging steps are connected to the engaging protrusions. Therefore, rigidity is more increased.

A power supply device according to a fifth aspect of the present invention that includes any one of the above configurations may include binding bar fixing bolts that are inserted through the reinforcing members to fix the end plates on a side of each of the binding bars. In the power supply device according to a fifth aspect of the present invention, each of the binding bars may include a plurality of binding bar bolt holes, the binding bar bolt holes are used to insert the binding bar fixing bolts into the engaging steps, and the binding bar bolt holes may be arranged in the direction intersecting with the stack direction of the battery stack body, and each of the end plates may include a plurality of end plate bolt holes, the end plate bolt holes are used to insert the binding bar fixing bolts into the engaging protrusions, and the end plate bolt holes may be arranged in a direction that intersects with a direction in which the battery stack body is stacked.

In a power supply device according to a sixth aspect of the present invention that includes any one of the above configurations, the binding bar bolt holes or the end plate bolt holes may be formed as enlonged circular shaped holes that are long in the stack direction of the battery stack body. The above configuration absorbs manufacturing tolerances of secondary battery cells at a time of manufacture of the power supply device. Therefore, the power supply device is assembled while an appropriate force that binds the power supply device is applied to the power supply device.

In a power supply device according to a seventh aspect of the present invention that includes any one of the above configurations, the binding bar fixing bolts may be stepped bolts that each have a step that corresponds to a thickness of the reinforcing members.

In a power supply device according to an eighth aspect of the present invention that includes any one of the above configurations, each of the reinforcing members may include a reinforcing member recess, and an inner wall of the reinforcing member recess may form each of the engaging steps.

In a power supply device according to a ninth aspect of the present invention that includes any one of the above configurations, in a state where the engaging protrusions are inserted in the engaging steps, gaps may be formed on both sides of a portion where the engaging steps are in contact with the mating engaging protrusions.

In a power supply device according to a tenth aspect of the present invention that includes any one of the above configurations, edges of each of the binding bars may not bent, and thus a cross section of each of the edges may not have an L shape. According to the above configuration, the binding bars are flat plates. Further, the engaging steps are formed in the binding bars, and the engaging protrusions that are fitted to the engaging steps, respectively, are formed on the end plates. Therefore, edges of the binding bars that are conventionally bent are not bent. Therefore, a stress does not concentrate on the edges of the binding bars.

A power supply device according to an eleventh aspect of the present invention that includes any one of the above configurations may include an insulating sheet interposed between each of the binding bars and the battery stack body.

A power supply device according to a twelfth aspect of the present invention that includes any one of the above configurations may be used to drive a vehicle.

A vehicle equipped with a power supply device according to a thirteenth aspect of the present invention includes a power supply device that includes any one of the above configurations, a motor for traction to which the power supply device supplies electrical energy, a vehicle body to which the power supply device and the motor are mounted, and wheels driven by the motor to allow the vehicle body to travel.

An electricity storage device equipped with a power supply device according to a fourteenth aspect of the present invention includes a power supply device that includes any one of the above configurations, the power supply device, and a power-supply controller that controls charging and discharging of the power supply device. The power-supply controller allows electrical energy from an outside to be used to charge the secondary battery cells, and charges the secondary battery cells.

DESCRIPTION OF EMBODIMENTS

Figure 1:
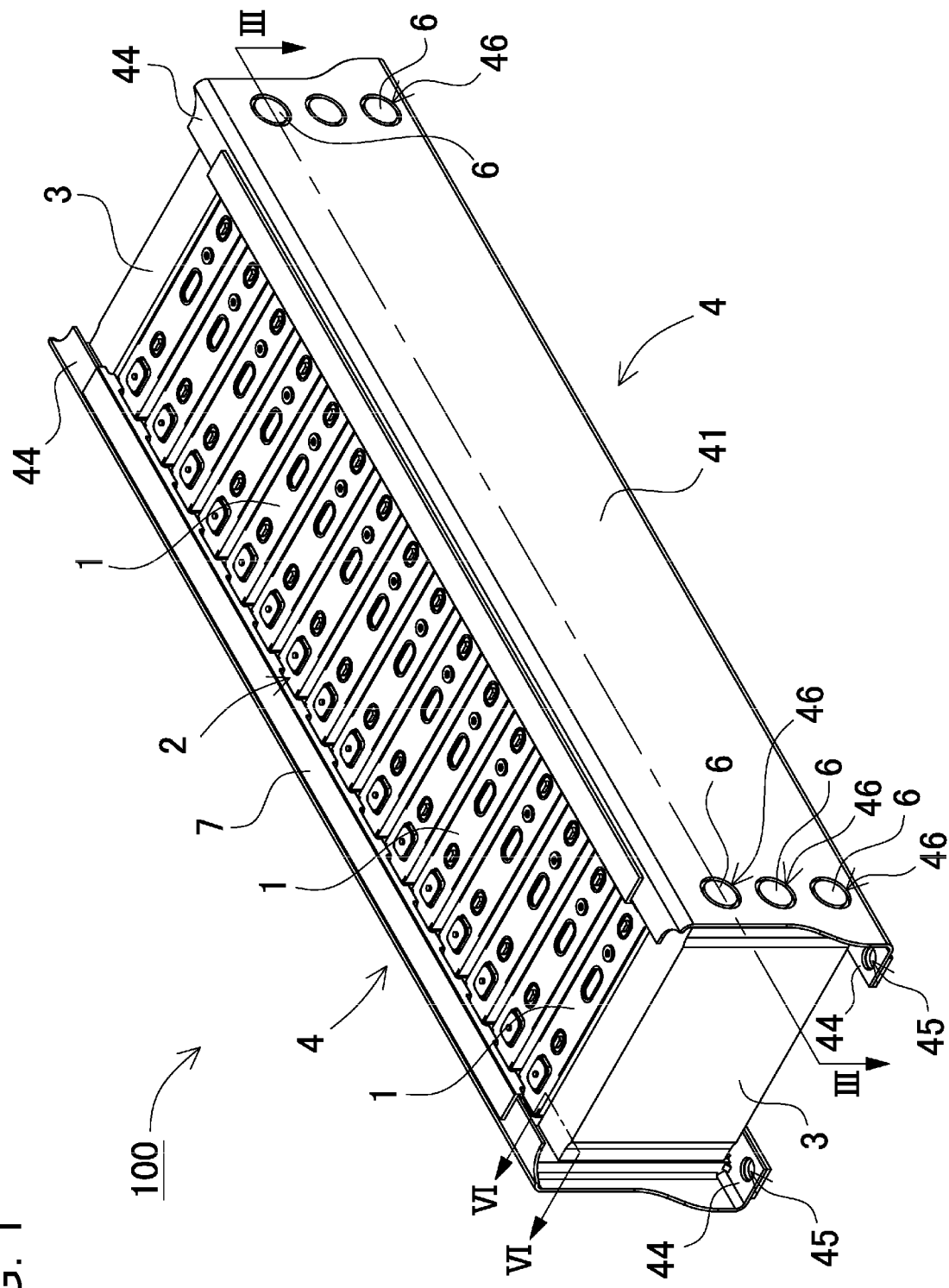
FIG. 1 is a perspective view that illustrates a power supply device according to an exemplary embodiment of the present invention.

Hereinafter, an exemplary embodiment of the present invention will be described with reference to the drawings. However, the exemplary embodiment described below shows only an example that allows a technical idea of the present invention to be embodied, and the present invention is not limited to the exemplary embodiment described below. The present description never limits members recited in the claims to members in the exemplary embodiment. It is not intended to limit the scope of the present invention to sizes, materials, and shapes of components and relative arrangement between the components, in particular, which are described in the exemplary embodiment, unless otherwise specified. The sizes, materials, and shapes of components and relative arrangement between the components are mere examples for explanation. Sizes and positional relation of components in the drawings may be exaggerated for clear explanation. Furthermore, in the following description, same names or same reference marks denote same components or same types of components, and detailed description is therefore appropriately omitted. Regarding elements that constitute the present invention, one component may form a plurality of elements of the elements, and thus the one component may function as the plurality of elements of the elements. A function of one component may be shared by a plurality of components.

First Exemplary Embodiment

Figure 2:
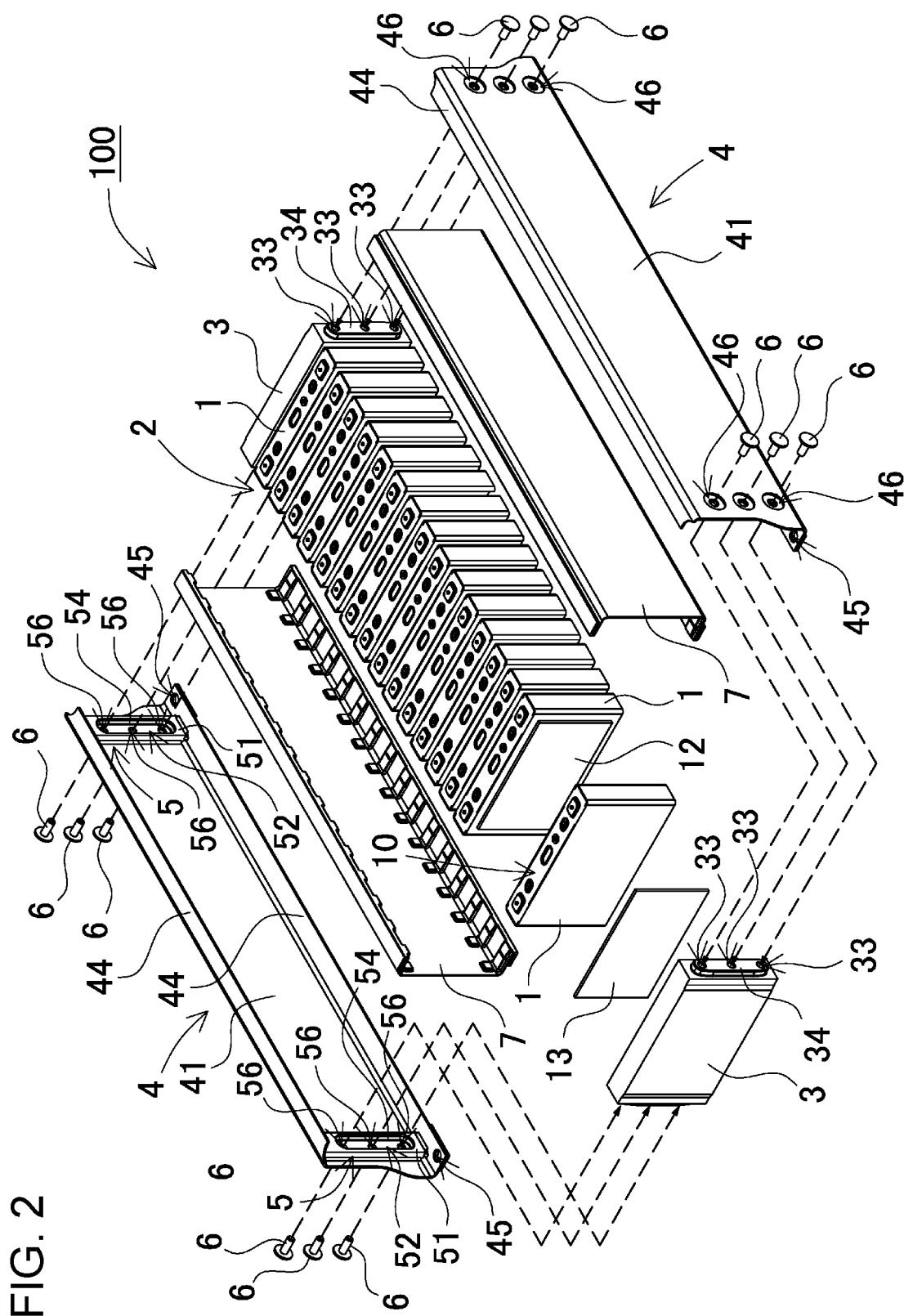
FIG. 2 is an exploded perspective view of the power supply device illustrated in FIG. 1.

FIG. 1 is a perspective view that illustrates power supply device 100 according to a first exemplary embodiment of the present invention. FIG. 2 is an exploded perspective view that illustrates power supply device 100 according to the first exemplary embodiment of the present invention. Power supply device 100 illustrated in FIGS. 1 and 2 includes battery stack body 2 that includes a plurality of secondary battery cells 1 that are stacked, a pair of end plates 3 disposed at both ends of battery stack body 2, and a pair of binding bars 4 that bind battery stack body 2. Both ends of binding bars 4 are connected with the pair of end plates 3. Reinforcing member 5 is interposed between each of end plates 3 and each of binding bars 4. As illustrated in FIGS. 1 and 2, insulating sheet 7 may be interposed between each of binding bars 4 and the battery stack body.

(Secondary Battery Cell 1)

As illustrated in FIG. 2, secondary battery cells 1 are each a rectangular (=prismatic) battery that has a width that is wider than a thickness. In other words, secondary battery cells 1 are each a rectangular battery that is narrower than a width. Battery stack body 2 includes secondary battery cells 1 stacked in a thickness direction of secondary battery cells 1. Secondary battery cells 1 are lithium-ion secondary batteries. However, the secondary battery cells may be nickel hydride batteries, nickel-cadmium batteries, or any other rechargeable secondary batteries. Each of secondary battery cells 1 houses positive and negative electrode plates, and electrolyte in an exterior can that is hermetically closed. A metal plate made of aluminum or an aluminum alloy, for example, is shaped into a cuboid by pressing. An opening of the metal plate that has been shaped into a cuboid is hermetically sealed with a sealing plate. Consequently, the exterior can is made. The sealing plate is made of aluminum or an aluminum alloy, similarly as the exterior can. A positive-electrode terminal and a negative-electrode terminal are fixed to both ends of the sealing plate, respectively. The sealing plate includes a gas discharging valve disposed between the positive-electrode terminal and the negative-electrode terminal.

The plurality of secondary battery cells 1 are stacked and constitute battery stack body 2. A thickness direction of secondary battery cells 1 is a direction in which secondary battery cells 1 are stacked. The plurality of secondary battery cells 1 are stacked in such a manner that terminal surfaces 10 of secondary battery cells 1 that each include the positive-electrode terminal and the negative-electrode terminal are arranged on a same plane. Consequently, the plurality of secondary battery cells 1 constitute battery stack body 2.

(Separator 12)

As illustrated in FIG. 2, battery stack body 2 includes separators 12 held between secondary battery cells 1 that are stacked. In FIG. 2, each of separators 12 is made of an insulating material and has a shape like a thin plate or a sheet. Each of separators 12 illustrated in FIG. 2 has a shape like a plate. Each of separators 12 has a size substantially equal to a size of a surface of secondary battery cell 1 that is opposite separator 12. Each of separators 12 is interposed between secondary battery cells 1 that are adjacent to each other, and thus insulates secondary battery cell 1 that are adjacent to each other from each other. In addition to separators 12, second spacers may be disposed between secondary battery cells 1 that are adjacent to each other. If spacers that each have a shape that forms a flow path between the spacer and adjacent secondary battery cell 1, and the flow path is for cooling gas, secondary battery cells 1 are cooled. Further, a surface of each of secondary battery cells 1 may be coated with an insulating material. A shrink tube made of polyethylene terephthalate (PET) resin, for example, may be thermally welded on a surface of the exterior can of each of the secondary battery cells. However, the shrink tube is not thermally welded on an electrode portion of the exterior can.

(Battery Stack Body 2)

In battery stack body 2, bus bars (not illustrated) made of a metal are connected with positive-electrode terminals and negative-electrode terminals of secondary battery cells 1 that are adjacent to each other. Consequently, the plurality of secondary battery cells 1 are connected with each other through the bus bars in series, in parallel, or in series and in parallel. Battery stack body 2 illustrated in the drawings includes 16 secondary battery cells 1 connected with each other in series. However, a number of secondary battery cells 1 that constitute the battery stack body and a state in which secondary battery cells 1 are connected with each other are not limited, according to the present invention.

End-surface spacer 13 is disposed on each of end surfaces of battery stack body 2. End plate 3 is disposed on each of end-surface spacers 13. As illustrated in FIG. 2, each of end-surface spacers 13 is disposed between battery stack body 2 and adjacent end plate 3, and thus insulates end plate 3 from battery stack 2. End-surface spacers 13 are made of a material similar to the above material of which separators 12 are made.

(End Plate 3)

As illustrated in FIGS. 1 and 2, end plate 3 is disposed at each end of battery stack body 2. End plates 3 are bound by binding bars 4 arranged along both sides of battery stack body 2. End plates 3 are at both ends of battery stack body 2, respectively. The both ends are ends in a direction in which secondary battery cells 1 are stacked. End plates 3 are disposed on outer sides of end-surface spacers 13, respectively. Consequently, battery stack body 2 is held between end plates 3. End plates 3 are made of an aluminum alloy. Examples of the aluminum alloy include Al—Cu—Mg alloys, Al—Cu—Ni—Mg alloys, Al—Cu—Si alloys, Al—Si—Mg alloys, Al—Si—Cu alloys, Al—Si—Cu—Mg alloys, and Al—Si—Cu—Ni—Mg alloys. End plates 3 made of an aluminum alloy are a heat-treatable alloy. An aluminum alloy is shaped into end plates 3 by die casting. Preferably, end plates 3 made of an aluminum alloy are tempered by heat treatment that includes solution heat treatment, quenching, and aging.

An outer shape of each of end plates 3 is rectangular. End plates 3 are arranged on end surfaces of battery stack body 2, and are opposite each other. In FIGS. 1 and 2, an outer shape of each of end plates 3 is substantially same as an outer shape of secondary battery cells 1. In other words, in FIGS. 1 and 2, end plates 3 have a width in a lateral direction that is equal to a width of secondary battery cells 1 in the lateral direction. Further, end plates 3 have a height in a vertical direction that is equal to a height of secondary battery cells 1 in the vertical direction. In the present description, the vertical direction is a vertical direction in FIGS. 1 and 2. Further, the lateral direction is a lateral direction in FIGS. 1 and 2. The lateral direction means a horizontal direction that is perpendicular to a direction in which the batteries are stacked.

End plate bolt holes 33 are formed in each of left and right sides of each of end plates 3 illustrated in FIG. 2. End plate bolt holes 33 are used to fix end plates 3 to binding bars 4. In each of end plates 3, the plurality of end plate bolt holes 33 are formed in such a manner that the plurality of end plate bolt holes 33 are vertically apart from each other. In an example in FIG. 2, three end plate bolt holes 33 are formed in each of both sides of each of end plates 3. A total number of end plate bolt holes 33 is six for each of end plates 3. Binding bar fixing bolts 6 are inserted into end plate bolt holes 33 to fix end plates 3.

(Binding Bar 4)

The pair of binding bars 4 cover sides of battery stack body 2, respectively. Binding bars 4 at both sides of battery stack body 2 bind end plates 3. Each of binding bars 4 includes binding bar main surface 41. Binding bar main surface 41 has a size that substantially covers a side of battery stack body 2. Binding bar main surface 41 has a shape like a plate that extends from one edge to the other edge in the stack direction of battery stack body 2. Preferably, edges of each of binding bars 4 are not bent, and thus a cross section of each of the edges does not have a shape like a letter "L".

As illustrated in FIGS. 1 and 2, binding bars 4 extend in the stack direction of battery stack body 2. Both ends of binding bars 4 are fixed to end plates 3 disposed on both end surfaces of battery stack body 2. Consequently, binding bars 4 and end plates 3 bind battery stack body 2 in the stack direction of battery stack body 2. Each of binding bars 4 is a metal plate that has a predetermined thickness and a predetermined width that fits a side surface of battery stack body 2. Binding bars 4 are arranged on both sides of battery stack body 2, and are opposite each other. Metal plates made of iron, for example, are used for binding bars 4. Preferably, steel plates are used for binding bars 4. Binding bars 4 made of metal plates are bent into predetermined shapes by pressing.

Each of binding bars 4 includes binding bar main surface 41 disposed along a side surface of battery stack body 2. Each of binding bars 4 includes bent portions 44 that extend along an upper edge of a middle portion of binding bar main surface 41. Bent portions 44 are not formed at both ends of binding bar main surface 41. Bent portions 44 support a top surface and a bottom surface of battery stack body 2. Both ends of binding bar main surface 41 are not bent. Therefore, there are not conventional L-shaped bent portions fixed to outer surfaces of the end plates. Binding bar main surface 41 is rectangular and has a size that covers substantially completely battery stack body 2 and end plates 3 disposed at both ends of battery stack body 2. In FIG. 1, binding bar main surface 41 covers substantially completely a side surface of battery stack body 2. There is no gap between binding bar main surface 41 and battery stack body 2. However, at least one opening may be formed through the binding bar main surface to expose part of a side surface of the battery stack body.

Bent portions 44 support top surfaces and bottom surfaces, respectively, of secondary battery cells 1 that constitute battery stack body 2, and thus do not allow terminal surfaces 10 of secondary battery cells 1 to vertically move. Bolt holes at the bent portions may be formed to fix power supply device 100 to an object, such as a vehicle. In an example in FIG. 2, bolt holes 45 are formed at lower bent portions 44.

Insulating sheet 7 is disposed on an inner surface of binding bar main surface 41 and inner surfaces of bent portions 44 of binding bar 4. Insulating sheet 7 insulates secondary battery cells 1 of battery stack body 2 from binding bar 4. In FIG. 2, each of insulating sheets 7 is bent in such a manner that a vertical cross section of whole insulating sheet 7 is C-shaped. Consequently, each of insulating sheets 7 has a shape and a size that are substantially same as a shape and a size of binding bar 4. A top-surface of each of insulating sheets 7 is folded back and sandwiches an edge of upper bent portion 44 of binding bar 4. Consequently, the top-surface of each of insulating sheets 7 covers a top surface of bent portion 44, as illustrated in a perspective view of FIG. 1. A cushioning material not illustrated may be disposed on an inner surface of each of ends of binding bar main surface 41 of each of binding bars 4 to protect both sides of end plates 3 from impacts, such as vibration.

(Engaging Step 54, Engaging Protrusion 34)

Figure 3:
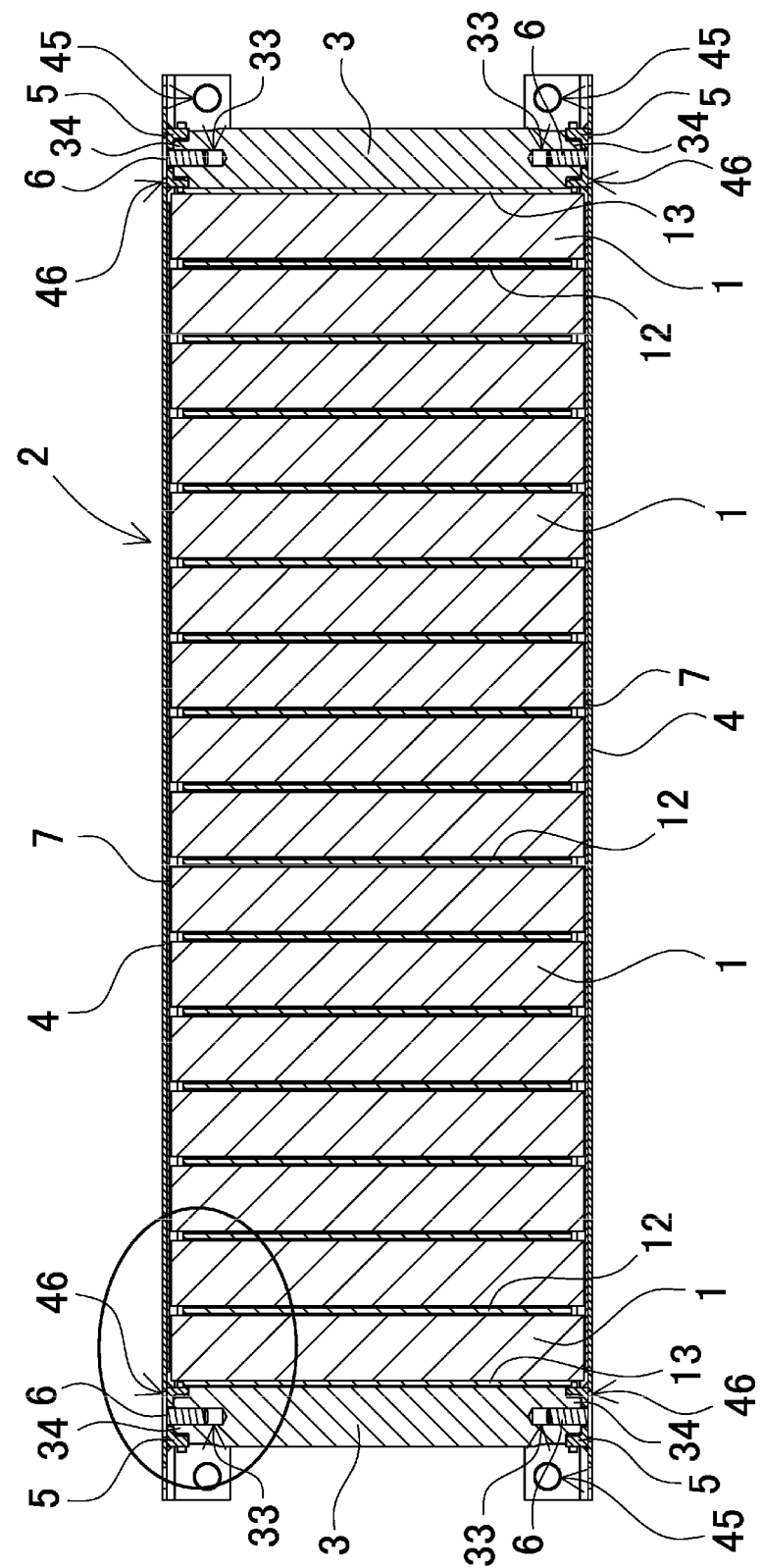
FIG. 3 is a horizontal cross-sectional view of the power supply device taken along line III-III in FIG. 1.

As illustrated in a horizontal cross-sectional view of FIG. 3, each of binding bars 4 includes engaging steps 54 (the reference mark of 54 is not described in FIG. 3) that are opposite end plates 3, respectively. Each of engaging steps 54 extends in the direction intersecting with the stack direction of battery stack body 2. Each of end plates 3 includes engaging protrusions 34 that are opposite binding bars 4, respectively. Engaging protrusions 34 engage with engaging steps 54. Consequently, rigidity that binds battery stack body 2 together is increased without changing a material and a thickness of the binding bars, compared with conventional binding bars whose edges are each bent into a shape like a letter "L".

Figure 14:
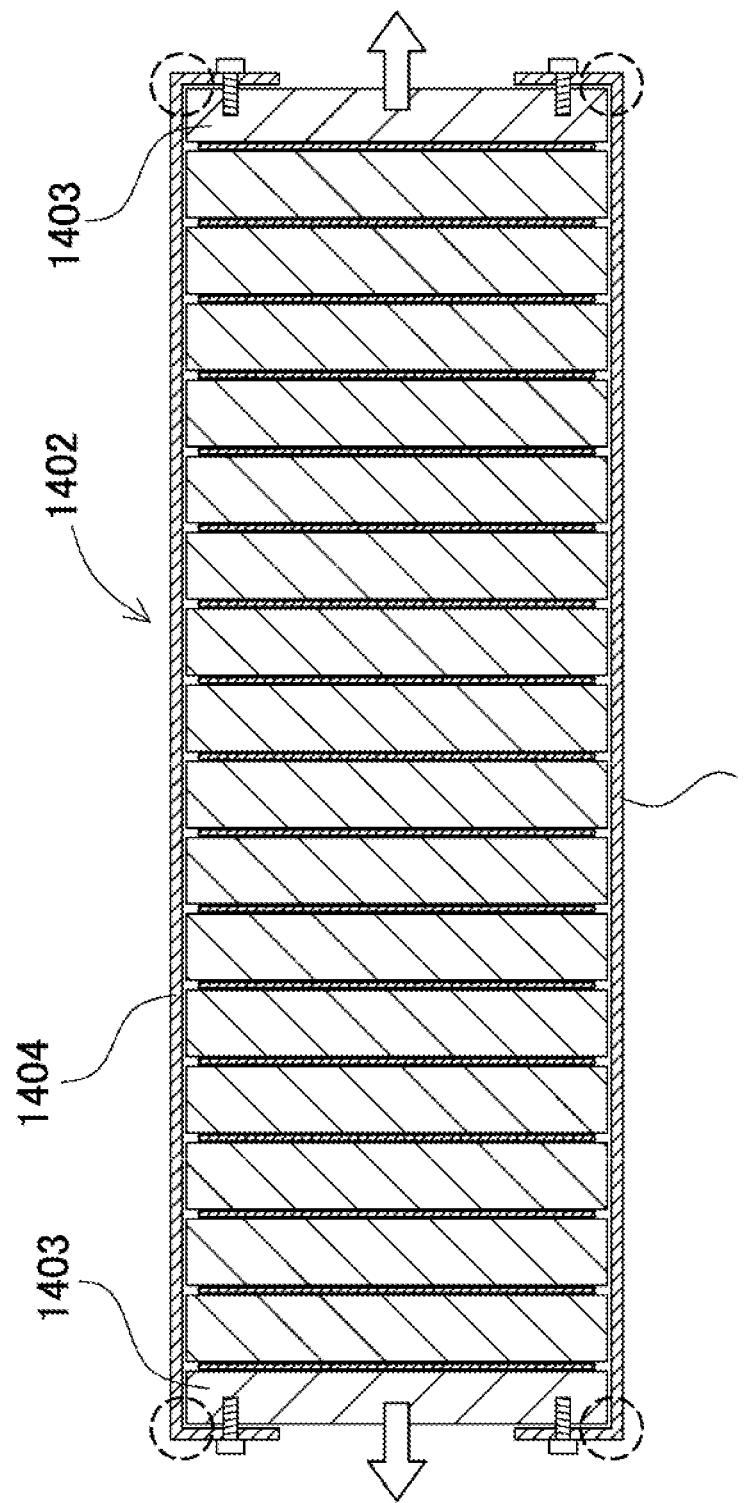
FIG. 14 is a schematic horizontal cross-sectional view that illustrates a stress that concentrates on binding bars that each have a shape like a letter "L".

In a conventional configuration, edges of binding bars are each bent into a shape like a letter "L", and the bent edges are fixed to main surfaces of end plates 3. In case of such a conventional configuration, when battery stack body 1402 that is expanding pushes end plates 1403, as illustrated in circles drawn with a broken line in a horizontal cross-sectional view of FIG. 14, a bending moment is applied to bent portions of binding bars 1404, and thus a stress concentrates on the bent portions of binding bars 1404. Consequently, the bent portions of binding bars 1404 may open or may break.

In the power supply device in FIG. 3, engaging protrusions 34 engage with engaging steps 54 (the reference mark of 54 is not described in FIG. 3). Therefore, a load due to expansion of the secondary battery cells is linearly applied binding bars 4. That is to say, a force is received by the binding bars in a direction in which the binding bars are stretched, as illustrated in a horizontal cross-sectional view of FIG. 3. Therefore, a stress does not concentrate.

According to a conventional binding method, binding bars are bent, and the bent portions are arranged on end plates. In the present exemplary embodiment, however, binding bars are not bent, but protrusions of end plates engage with steps of the binding bars. Consequently, a stress does not concentrate on the binding bars.

As described above, edges, in a longitudinal direction, of binding bars 4 are each not bent into a shape like a letter "L". Therefore, binding bars 4 are flat plates. Further, engaging steps 54 are formed in binding bars 4, and engaging protrusions 34 that fit into engaging steps 54, respectively, are formed on end plates 5. Therefore, edges of the binding bars that are conventionally bent are not bent. Therefore, a stress does not concentrate on the edges of the binding bars.

(Reinforcing Member 5)

In an example illustrated in a horizontal cross-sectional view of FIG. 3, reinforcing members 5 are arranged on a surface of each of binding bars 4. Reinforcing members 5 are between the surface of each of binding bars 4 and adjacent end plate 3. Engaging step 54 (the reference mark of 54 is not described in FIG. 3) is formed in each of reinforcing members 5. Consequently, the engaging steps make easier the design manufacturability in a thickness of edges of the binding bars. The thickness allows engaging steps 54 to be formed. Further, a thickness of the binding bars themselves is not thick. Consequently, a thickness of portions of the binding bars where the binding bars are fixed to the end plates is easily adjusted. Therefore, a manufacturing cost decreases. That is, the binding bars themselves are made of a conventional material. Further, only portions that need a large thickness are thick. Therefore, the whole binding bars do not need to be thick. Therefore, a weight of the binding bars does not increase.

Reinforcing members 5 are made of a metal. Preferably, reinforcing member 5 are made of a metal that is same as a metal of which binding bars 4 are made, or reinforcing member 5 are made of a metal that is more rigid than a metal of which binding bars 4 are made. Preferably, reinforcing members 5 and binding bars 4 are integrally made. For example, a tailored blank is used to make binding bar 4 that has engaging steps 54 and has different shapes and different thicknesses. Consequently, reinforcing members 5 and each of the binding bars are integrally made. Alternatively, reinforcing members may be separately prepared, and the reinforcing members may be welded to binding bars. Consequently, the reinforcing members are preliminarily welded to the binding bars. Therefore, assembly is simplified.

The reinforcing members are not necessarily essential. For example, each of the binding bars is preliminarily cut to form thick portions. The engaging steps are formed at the thick portions.

(Binding Bar Fixing Bolt 6)

As described above, engaging protrusions 34 engage with engaging steps 54. Further, binding bars 4 are fixed to end plates 3 with bolts. In an example in FIG. 2, binding bar fixing bolts 6 are inserted through reinforcing members 5 to fix end plates 3 on a side surface of each of binding bars 4.

Each of binding bars 4 includes binding bar bolt holes 46. Binding bar bolt holes 46 are used to insert binding bar fixing bolts 6 into engaging steps 54. The plurality of binding bar bolt holes 46 are formed in such a manner that the plurality of binding bar bolt holes 46 are arranged in the direction intersecting with the stack direction of battery stack body 2.

Each of end plates 3 includes end plate bolt holes 33 into which binding bar fixing bolts 6 are inserted. End plate bolt holes 33 are formed in each of engaging protrusions 34. The plurality of end plate bolt holes 33 are formed in such a manner that the plurality of end plate bolt holes 33 correspond to binding bar bolt holes 46, and the plurality of end plate bolt holes 33 are arranged in the direction intersecting with the stack direction of battery stack body 2.

Binding bar bolt holes 46 are formed in such a manner that binding bar bolt holes 46 and corresponding engaging step 54 formed in reinforcing member 5 are arranged in the stack direction of battery stack body 2, and binding bar bolt holes 46 are outside corresponding engaging step 54 formed in reinforcing member 5. That is to say, binding bar bolt holes 46 are arranged on a side on which battery stack body 2 does not exist. More specifically, binding bar bolt holes 46 are formed in such a manner that binding bar bolt holes 46 and corresponding engaging step 54 are arranged in the stack direction of battery stack body 2, and binding bar bolt holes 46 are outside corresponding engaging step 54. That is to say, binding bar bolt holes 46 are formed on a side on which battery stack body 2 does not exist.

Further, engaging step 54 is formed as a surface that intersects with main surface 51 of reinforcing member 5. Preferably, engaging step 54 is formed as a surface that is substantially perpendicular to main surface 51 of reinforcing member 5. In an example illustrated in an exploded perspective view of FIG. 4, reinforcing member recess 52 is formed in main surface 51 of reinforcing member 5. Reinforcing member recess 52 has a bottom surface that is lower than main surface 51. A wall surface of reinforcing member recess 52 forms engaging step 54. Reinforcing member recess 52 is formed at substantially a center of main surface 51 of reinforcing member 5. Reinforcing member recess 52 is formed along a longitudinal direction of main surface 51 of reinforcing member 5. Reinforcing member recess 52 has a shape like a running track (=enlonged circular shape). Reinforcing member recess 52 that has a shape like a running track is larger than engaging protrusion 34 of end plate 3. Consequently, engaging protrusion 34 is inserted into reinforcing member recess 52.

Figure 5:
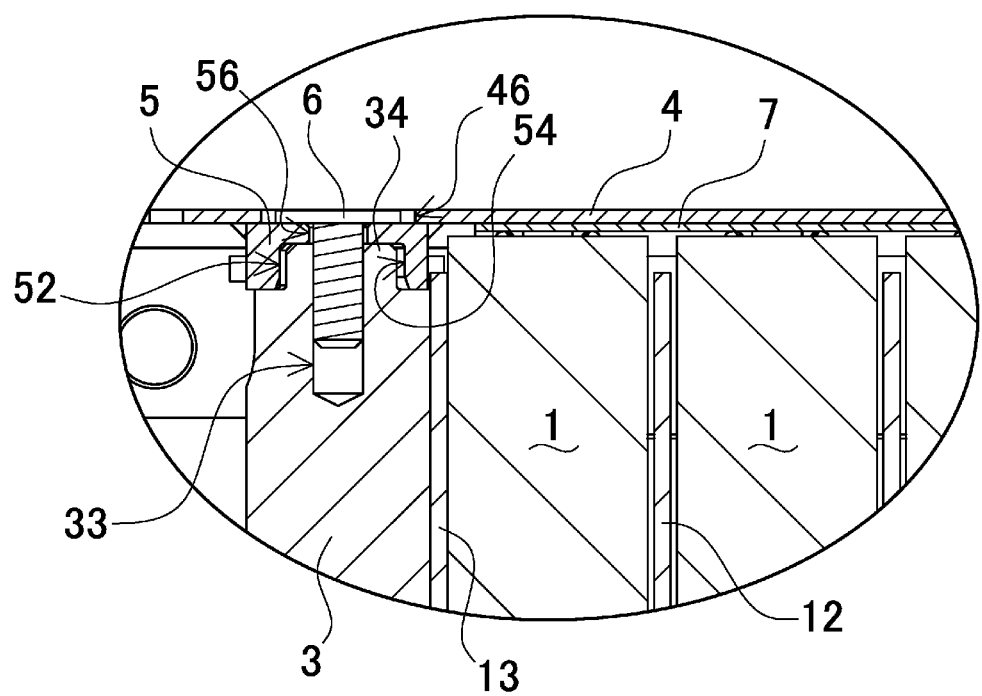
FIG. 5 is an enlarged cross-sectional view that illustrates a portion in which a binding bar fixing bolt is screwed.

Three binding bar bolt holes 46 are formed through each of edges of each of binding bars 4. Three binding bar bolt holes 46 are vertically arranged at substantially regular intervals. Reinforcing member holes 56 are formed through a bottom surface of reinforcing member recess 52 that forms engaging step 54 of reinforcing member 5. Binding bar bolt holes 46 are designed to be coaxial with reinforcing member holes 56, respectively. Consequently, engaging protrusion 34 of end plate 3 inserted into reinforcing member recess 52 is in contact with a bottom surface of reinforcing member recess 52. Further, end plate bolt holes 33 formed in engaging protrusion 34, reinforcing member holes 56 of reinforcing member 5, and binding bar bolt holes 46 of binding bar 4 align with each other. Therefore, binding bar fixing bolts 6 are screwed into from an outside of binding bar 4. The state is illustrated in a horizontal cross-sectional view of FIG. 5.

A bottom surface of reinforcing member recess 52 is lower than main surface 51 of reinforcing member 5. Consequently, engaging step 54 is formed. In other words, if a difference in a height between a bottom surface of reinforcing member recess 52 and main surface 51 of reinforcing member 5 is increased, an area of engaging step 54 increases. Consequently, rigidity that allows binding bar 4 to engage with and join to end plate 3 is increased. Preferably, reinforcing member recess 52 is deep to increase a difference in a height between a bottom surface of reinforcing member recess 52 and main surface 51 of reinforcing member 5. However, if reinforcing member recess 52 is too deep, strength of the end plate decreases. Preferably, a thickness of the binding bar at a bottom surface of reinforcing member recess 52 is equal to a thickness of the binding bar at the binding bar main surface except for reinforcing member 5. Consequently, formation of reinforcing member recess 52 does not decrease strength of the binding bar. Consequently, sufficient rigidity of the binding bar is maintained.

Figure 4:
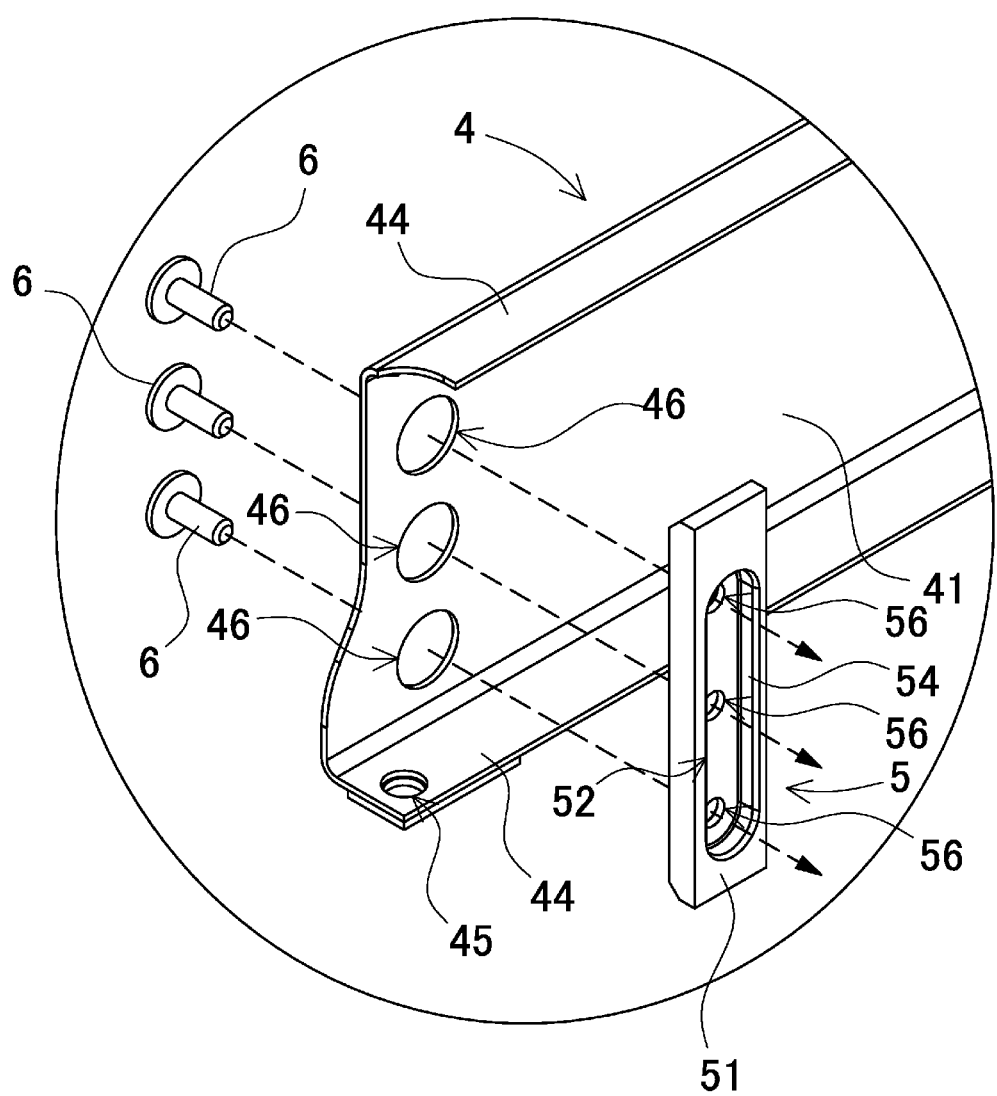
FIG. 4 is an exploded perspective view of a binding bar and a reinforcing member.

As illustrated in an exploded perspective view of FIG. 4, preferably, reinforcing member 5 through which reinforcing member recess 52 is formed is joined to each of edges of each of binding bars 4. Consequently, reinforcing member recess 52 that has a bottom is easily formed at each of edges of each of binding bars 4. Further, a thickness of a bottom plate of reinforcing member recess 52 is equal to a thickness of the binding bar main surface of binding bar 4 where reinforcing side recess 52 is not formed. Preferably, binding bar bolt holes 46 are preliminarily formed before reinforcing member 5 is joined, as illustrated in FIG. 4. However, binding bar bolt holes may be formed with a lathe after the reinforcing member is joined.

While engaging protrusion 34 is inserted in engaging step 54, a portion of engaging protrusion 34 is in contact with engaging step 54. Preferably, a shape of the portion is not a point but is a line or a surface. Consequently, a stress with which the binding bars bind the battery stack body does not concentrate on one point. A wide portion receives the stress, and thus the stress is dispersed. Therefore, rigidity increases.

(Gap GP)

Figure 6:
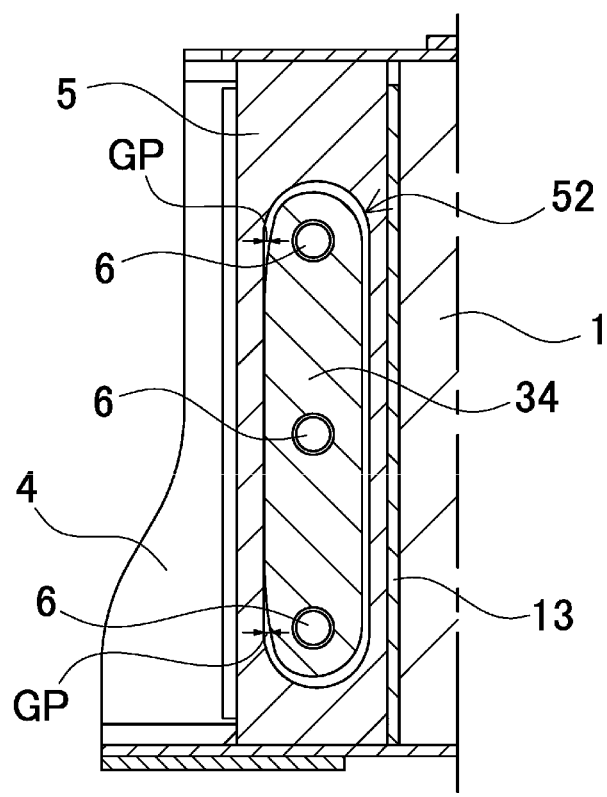
FIG. 6 is a vertical cross-sectional view of the power supply device taken along line VI-VI in FIG. 1.

While engaging protrusion 34 is inserted in engaging step 54, gaps GP are formed on both sides of a portion of engaging step 54 that is in contact with engaging protrusion 34. FIG. 6 is a vertical cross-sectional view taken along line VI-VI in FIG. 1. In an example illustrated in FIG. 6, reinforcing member recess 52 has a shape like a running track, engaging step 54 is a surface, and engaging protrusion that protrudes from end plate 3 is gently curved. Gaps GP that are gentle are formed on a right side and a left side of a portion of engaging step 54 that is in contact with the engaging protrusion. The above configuration allows reinforcing member 5 to slightly deform at gaps GP when secondary battery cells 1 expand. Consequently, the deformation due to the expansion is absorbed. Consequently, distortion due to the expansion is absorbed.

(Elliptical Holes 33B, 46B)

Figure 7:
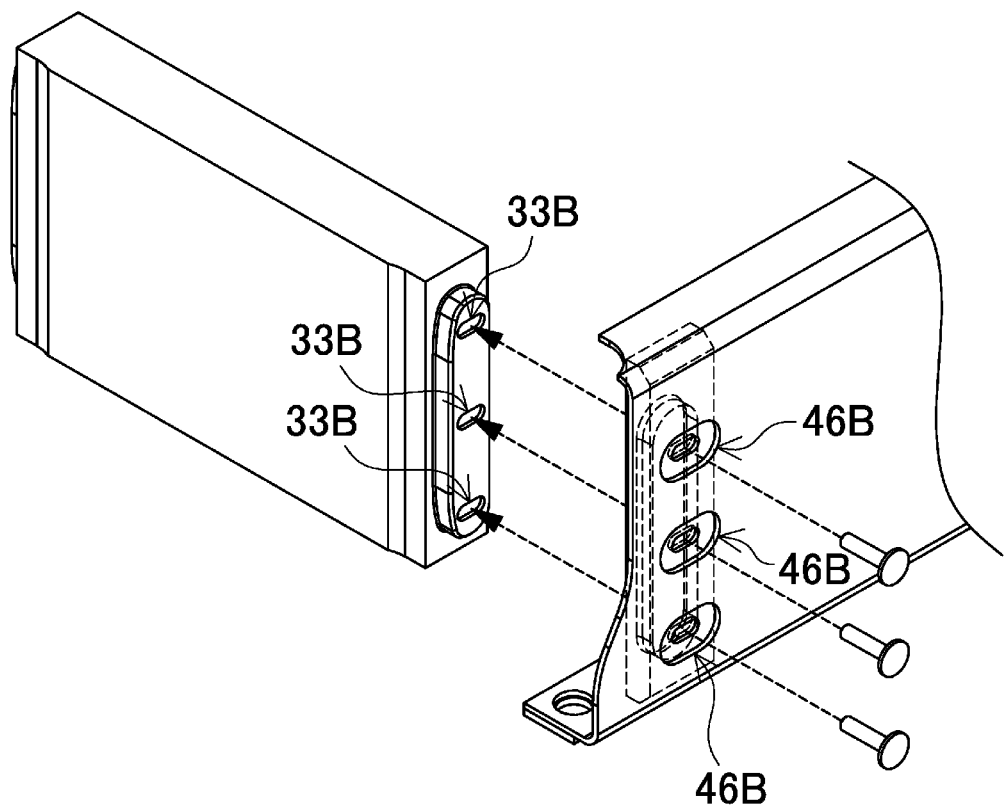
FIG. 7 is an enlarged cross-sectional view that illustrates a portion into which binding bar fixing bolts are screwed, in a power supply device according to a modified example.

Binding bar bolt holes 46 and end plate bolt holes 33 are circular, as illustrated in FIG. 2. Alternatively, binding bar bolt holes 46 and end plate bolt holes 33 may be formed as elliptical holes (=enlonged circular shaped holes) that are long in the stack direction of battery stack body 2, as illustrated in a modified example in FIG. 7. Consequently, when binding bars 4 are screwed to end plates 3, binding bar bolt holes 46B and end plate bolt holes 33B that are formed on elliptical holes easily absorb variation of thickness of battery stack body 2 due to manufacturing tolerances and other tolerances of secondary battery cells 1. Preferably, dimensions of the elliptical holes are designed especially in view of an initial binding force. Consequently, a minimum binding force is ensured.

Preferably, binding bar bolt holes 46 are larger than heads of binding bar fixing bolts 6. Consequently, the heads of binding bar fixing bolts 6 that have been screwed do not protrude from the main surface of end plate 3, as illustrated in an enlarged plan view of FIG. 5.

Figure 8:
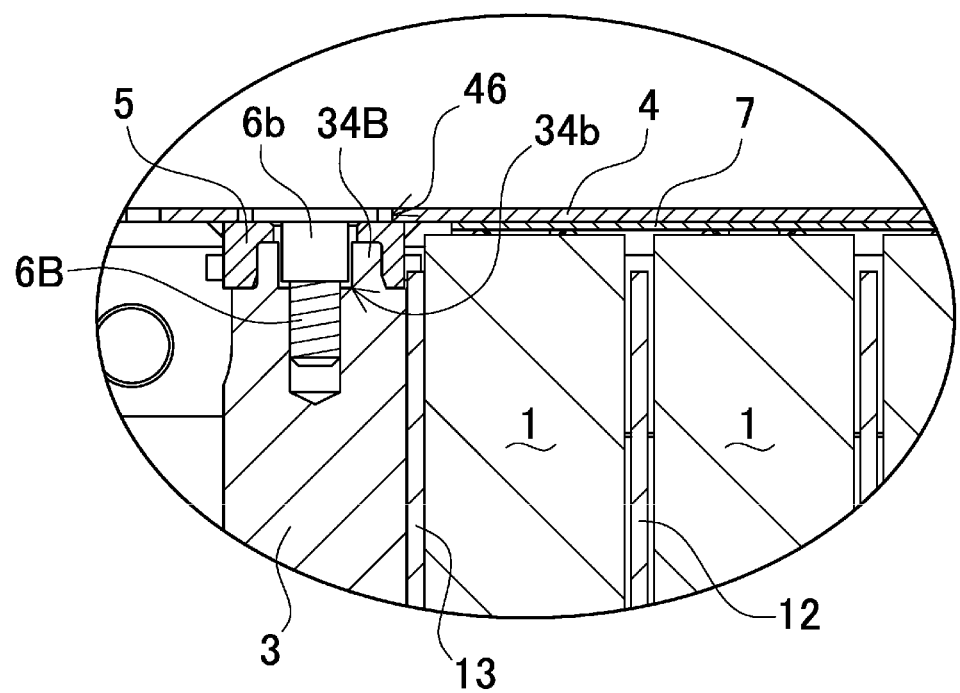
FIG. 8 is an enlarged cross-sectional view that illustrates a portion in which a binding bar fixing bolt is screwed, in a power supply device according to a modified example.

Further, binding bar fixing bolts 6 may be stepped bolts that each have a step that corresponds to a thickness of reinforcing member 5. FIG. 8 is an enlarged cross-sectional view that illustrates an example of the stepped bolts as a power supply device according to a modified example. As illustrated in FIG. 8, binding bar fixing bolt 6B includes step 6b that corresponds to a thickness of engaging protrusion 34B. Engaging protrusion 34B includes step 34b that fits step 6b. Consequently, when binding bar fixing bolt 6B is screwed, a force with which a bearing surface screws is increased.

In the above examples, the binding bars are fixed to the end plates with the bolts while the engaging protrusions engage with the engaging steps. The present invention is not limited to a configuration in which the binding bars are fixed to the end plates with the bolts. Alternatively, the binding bars may be fixed to the end plates by welding.

Figure 9:
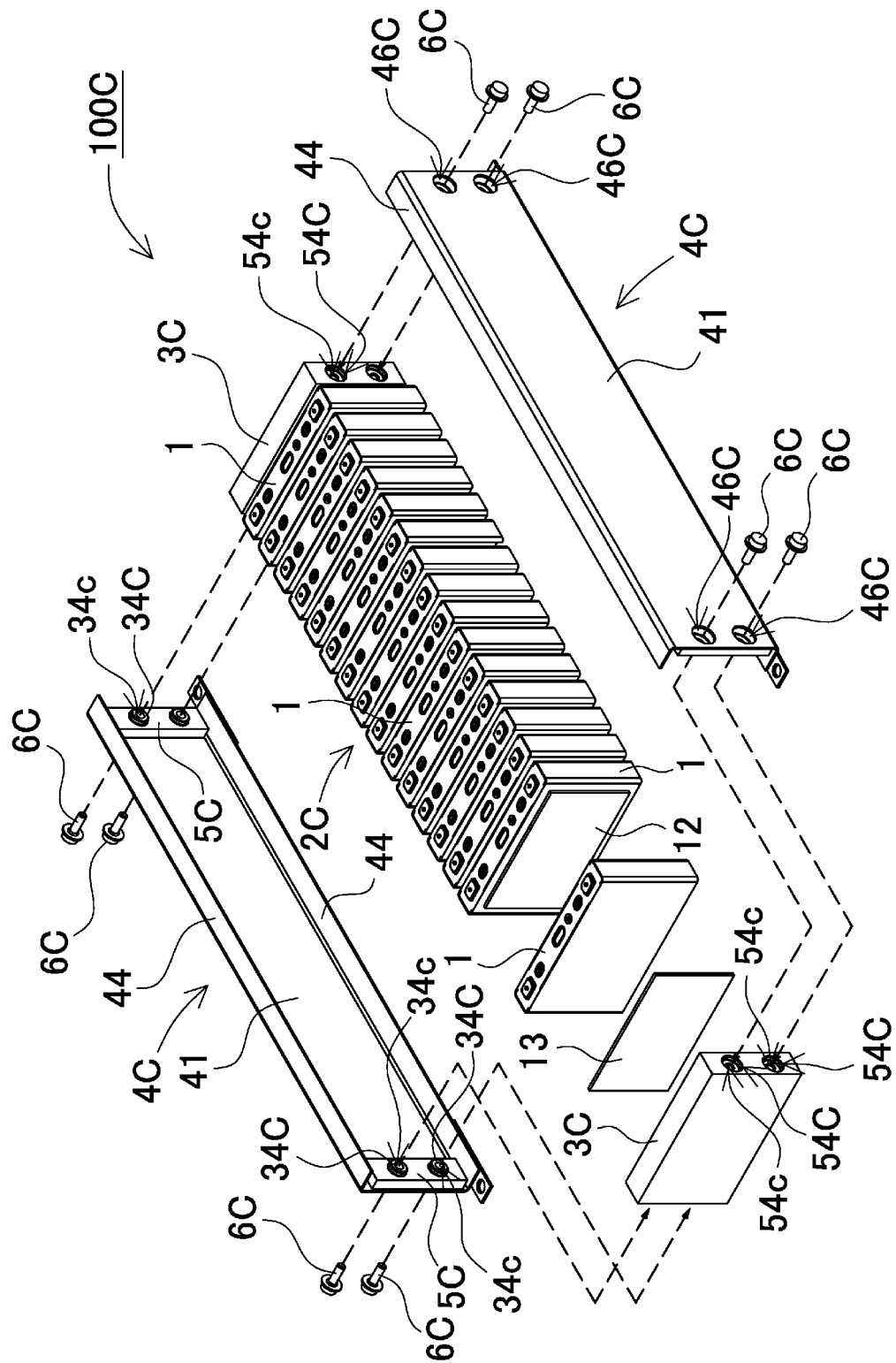
FIG. 9 is an exploded perspective view that illustrates a power supply device according to a modified example.

In the above examples, the engaging protrusions of the end plates are engaged with the engaging steps of the binding bars to connect the binding bars with the end plates. The present invention is not limited to the configuration. Alternatively, the engaging steps are formed at the end plates, and the engaging protrusions are formed at the binding bars. The engaging steps are not necessarily elliptical holes (=enlonged circular shaped holes), but may be circular holes. Further, part of bolts, such as bolt heads, may be used for the engaging. Further, a plurality of connection structures that each include an engaging step and an engaging protrusion may be formed. For example, a plurality of connection structures that each include an engaging step and an engaging protrusion are formed at each of sides of each of the end plates. The plurality of connection structures that each include an engaging step and an engaging protrusion are vertically arranged and are apart from each other. FIG. 9 is an exploded perspective view that illustrates an example of the plurality of connection structures, as a modified example. In power supply device 100C in FIG. 9, each of reinforcing members 5C is disposed on an inner surface at each of edges of each of binding bars 4C. That is to say, each of reinforcing members 5C is disposed at a portion of each of binding bars 4C that is opposite a side of end plate 3C. A plurality of disk-like engaging protrusions 34C protrude from reinforcing member 5C. In an example in FIG. 9, two disk-like engaging protrusions 34C are arranged in a direction that intersects with a direction in which battery stack body 2C is stacked, preferably, in a direction that is substantially perpendicular to the direction in which battery stack body 2 is stacked. Two disk-like engaging protrusions 34C are apart from each other. Engaging holes 54C are formed in each of sides of each of end plates 3C. Positions of engaging holes 54C are set to match positions of disk-like engaging protrusions 34C. Engaging holes 54C are engaging steps. Disk-like engaging protrusions 34C are inserted into engaging holes 54C.

Binding bar bolt holes 46C are formed through binding bars 4C. Binding bar fixing bolts 6C are inserted into binding bar bolt holes 46C. Disk-like engaging protrusions 34C and engaging holes 54C are arranged at positions that are set to match positions of binding bar bolt holes 46C. Bolt inserting hole 34c is formed through each of disk-like engaging protrusions 34C. Bolt inserting hole 54c is formed in each of engaging holes 54C. Binding bar fixing bolts 6C are inserted in bolt inserting holes 34c, 54c. In other words, binding bar fixing bolts 6C that screw the binding bars to the end plates are arranged at positions of connection structures that each include engaging step 54C and engaging protrusion 34C. Therefore, joint structures are fixing structures. Further, attention is not paid to positioning of reinforcing members 5C and binding bars 4C when the power supply device is assembled. Therefore, the assembly is simplified, and the connection structures are small and thin.

As described above, the binding bars and the end plates are screwed together by using the engaging protrusions and the engaging steps that engaging together. Therefore, a stress does not concentrate, compared with a conventional configuration. In the conventional configuration, binding bars are plates, and edges of the binding bars are each bent into a shape like a letter "L". The binding bars have rigidity higher than rigidity of the conventional binding bars, even if the binding bars are made of a material that is same as a material of which the conventional binding bars are made, and have a thickness that is equal to a thickness of the conventional binding bars. Therefore, the power supply device deals with expansion and contraction of secondary battery cells. The reinforcing members arranged on the binding bars especially increase strength of portions that receive load. Further, the reinforcing members arranged on the binding bars do not increase a thickness of the whole binding bars. Further, a thickness of portions where the binding bars are fixed is large, and thus rigidity is high, even if a reaction force of the secondary battery cells is generated by expansion of the secondary battery cells, and due to the reaction force of the secondary battery cells, a stress concentrates on the portions where the binding bars are fixed.

The power supply device described above is used as a power supply mounted on a vehicle. The power supply device is mounted on electrified vehicles, such as hybrid vehicles driven by both an engine and a motor, plug-in hybrid vehicles driven by both an engine and a motor, and electric vehicles driven only by a motor. The power supply device is used as a power supply for any of these vehicles. In an example described below, power supply device 1000 that has high capacity and high output is made to supply electrical energy to drive a vehicle. Power supply device 1000 includes a plurality of the above power supply devices connected with each other in series or parallel, and a necessary control circuit.

(Power Supply Device for Hybrid Vehicle)

Figure 10:
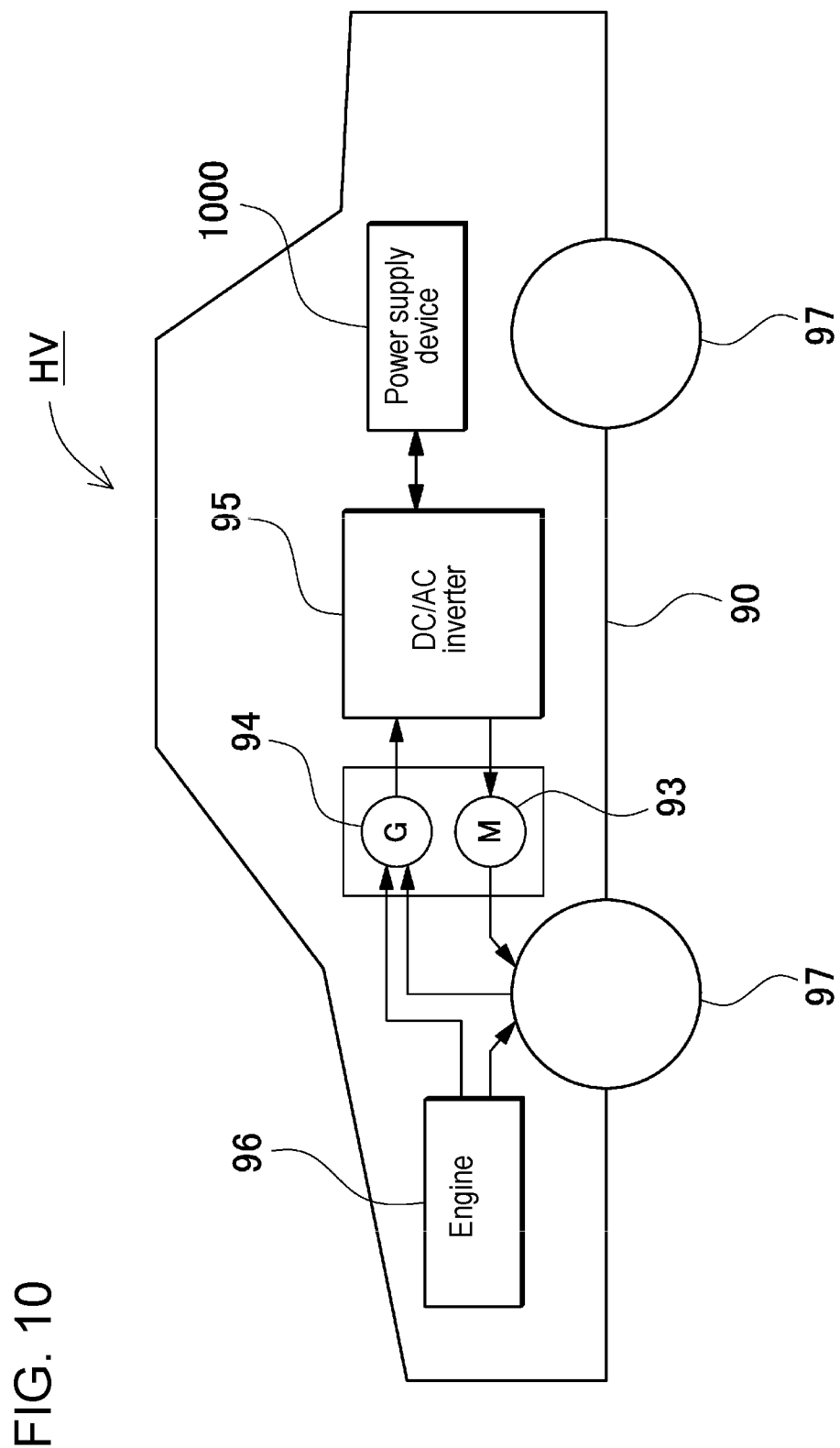
FIG. 10 is a block diagram that illustrates an example in which a power supply device is mounted on a hybrid vehicle driven by an engine and a motor.

FIG. 10 illustrates an example in which a power supply device is mounted on a hybrid vehicle driven by both an engine and a motor. Vehicle HV in FIG. 10 to which the power supply device is mounted includes vehicle body 90, engine 96 and motor 93 for traction that allow vehicle body 90 to travel, power supply device 1000 that supplies motor 93 with electrical energy, electric generator 94 that charges batteries of power supply device 1000, and wheels 97 driven by motor 93 and engine 96 to allow vehicle body 90 to travel. Power supply device 1000 is connected to motor 93 and electric generator 94 through direct current (DC)/alternating current (AC) inverter 95. Vehicle HV is allowed to travel by both of motor 93 and engine 96, and simultaneously charges and discharges the batteries of power supply device 1000. When engine efficiency is low, motor 93 operates and allows the vehicle to travel. For example, when the vehicle accelerates or travels at a low speed, motor 93 operates and allows the vehicle to travel. Motor 93 is driven by electrical energy supplied from power supply device 1000. Electric generator 94 is driven by engine 96 or is driven by regenerative braking when the vehicle brakes. Consequently, electric generator 94 charges the batteries of power supply device 1000.

(Power Supply Device for Electric Vehicle)

Figure 11:
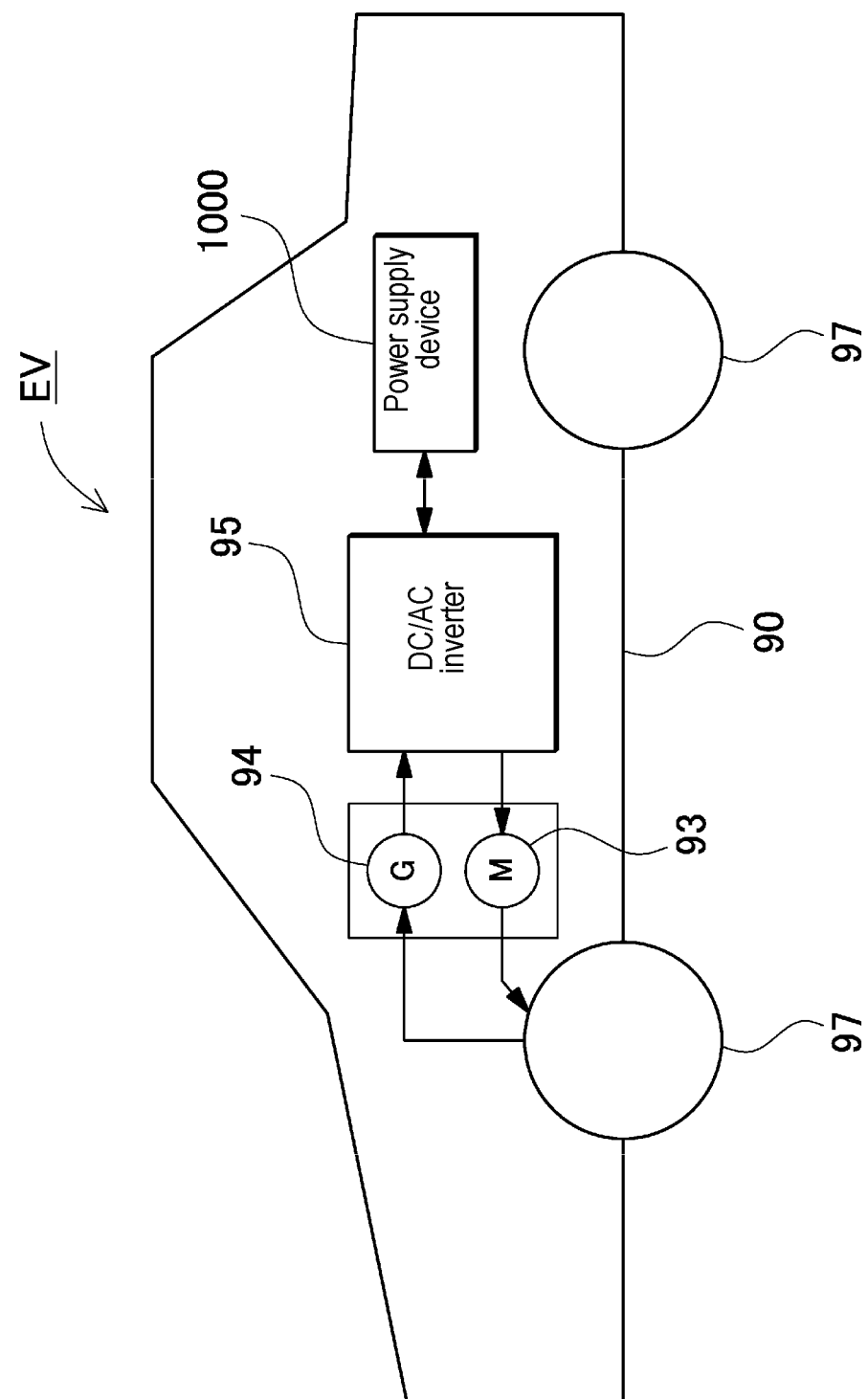
FIG. 11 is a block diagram that illustrates an example in which a power supply device is mounted on an electric vehicle driven only by a motor.

FIG. 11 illustrates an example in which a power supply device is mounted on an electric vehicle driven only by a motor. Vehicle EV in FIG. 11 to which the power supply device is mounted includes vehicle body 90, motor 93 for traction that allows vehicle body 90 to travel, power supply device 1000 that supplies motor 93 with electrical energy, electric generator 94 that charges batteries of power supply device 1000, and wheels 97 driven by motor 93 to allow vehicle body 90 to travel. Motor 93 is driven by electrical energy supplied from power supply device 1000. Electric generator 94 is driven by energy at a time of regenerative braking of vehicle EV, and thus charges the batteries of power supply device 1000.

(Power Supply Device for Electricity Storage)

Figure 12:
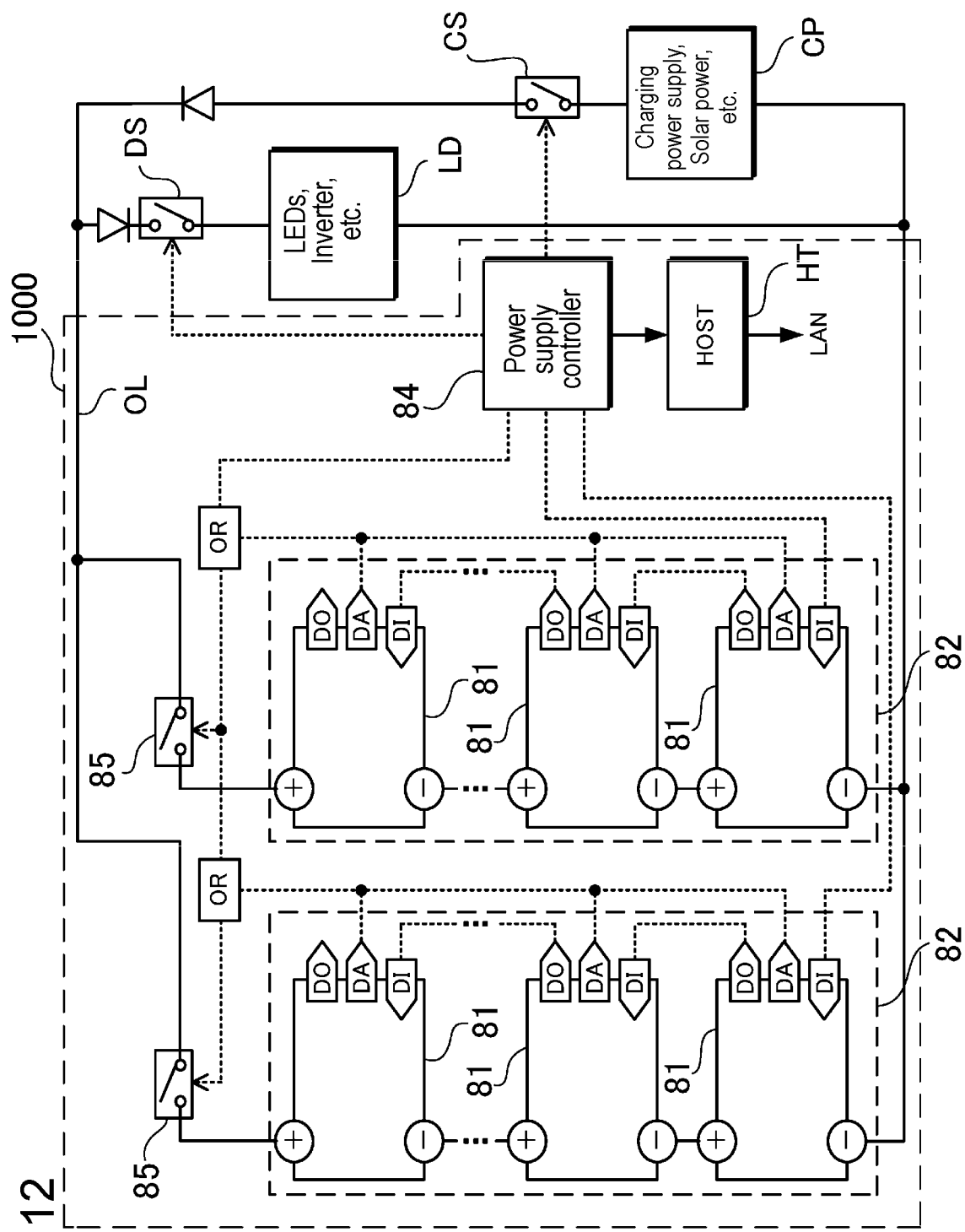
FIG. 12 is a block diagram that illustrates an example in which a power supply device is used as an electricity storage device.
Figure 13:
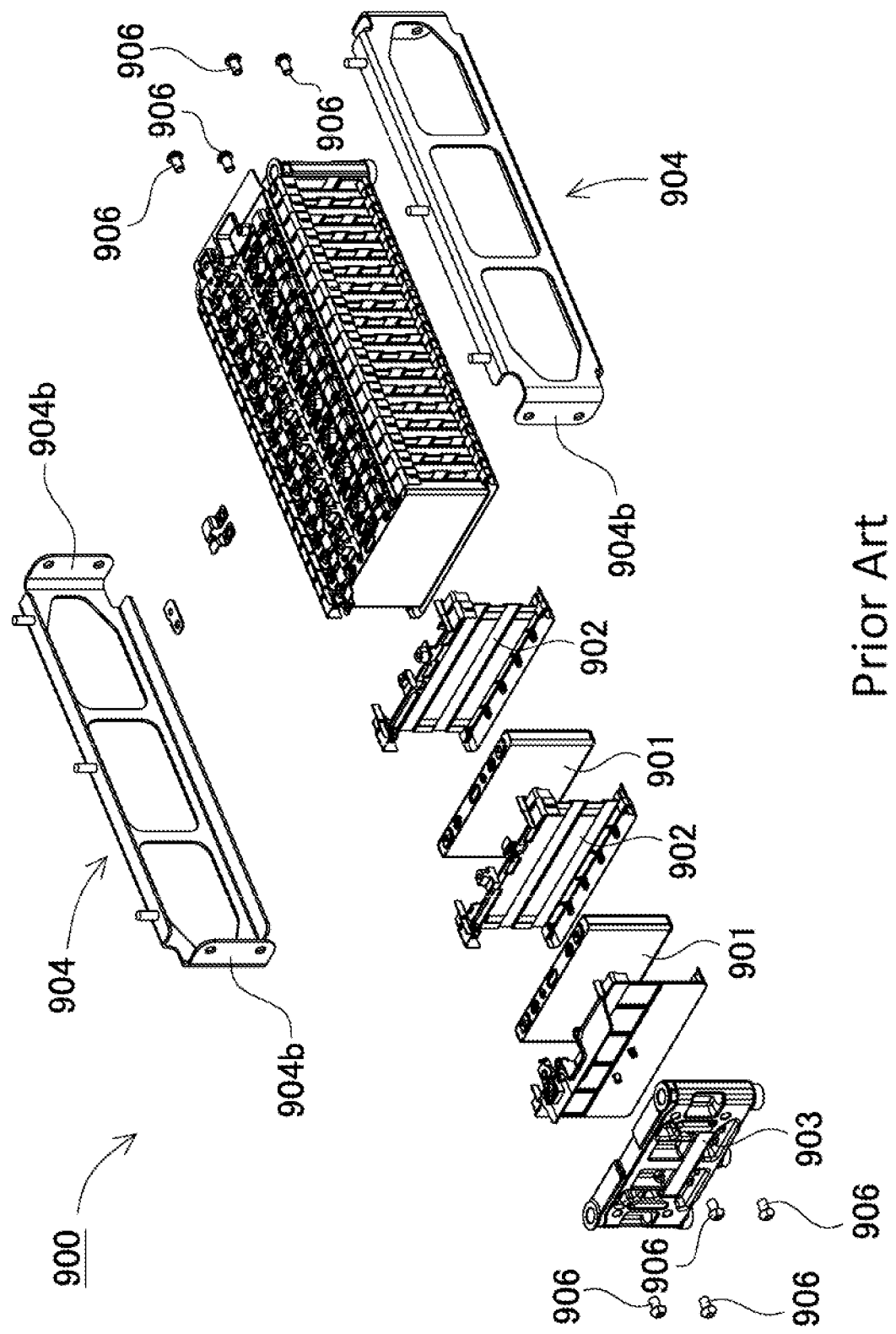
FIG. 13 is an exploded perspective view that illustrates a conventional power supply device.

Further, the power supply device is used not only as a power supply for a moving body, but also as stationary electricity-storage equipment. For example, the power supply device is used as a power supply system that is a power supply for household use or factory use, and charges batteries by using solar light and night-only electricity service and discharges electricity when the electricity is needed. Alternatively, the power supply device is used as a power supply for a street light that charges batteries by using solar light in daytime and discharges electricity at night. Alternatively, the power supply device is used as an uninterruptible power supply for traffic signals that operates in case of an electrical power failure. FIG. 12 illustrates such an example. Power supply device 1000 illustrated in FIG. 12 includes a plurality of battery packs 81. The plurality of battery packs 81 are connected with each other as units, and thus constitute battery units 82. Each of battery packs 81 includes a plurality of secondary battery cells connected with each other in series and/or in parallel. Battery packs 81 are controlled by power-supply controller 84. After power supply device 1000 charges battery units 82 by using power-supply-for charging CP, power supply device 1000 supplies power to loads LD. Therefore, power supply device 1000 has a charging mode and a discharging mode. Loads LD are connected with power supply device 1000 through discharge switch DS. Power-supply-for-charging CP is connected with power supply device 1000 through charge switch CS. Power-supply controller 84 of power supply device 1000 switches on or off discharge switch DS and charge switch CS. In the charging mode, power-supply controller 84 switches on charge switch CS and switches off discharge switch DS, and thus allows power-supply-for-charging CP to charge power supply device 1000. After charging is completed and thus the battery units are fully charged, or a state of charge of the battery units reaches at least a predetermined value, power-supply controller 84 switches off charge switch CS and switches on discharge switch DS, in response to a request from loads LD. Consequently, a charging mode is switched to a discharging mode. Consequently, power-supply controller 84 allows power supply device 1000 to discharge electricity into loads LD. The power supply controller may supply electrical energy to loads LD and may charge simultaneously power supply device 1000, as necessary, by switching on charge switch CS and switching on discharge switch DS.

Loads LD to which power supply device 1000 supplies power are connected with power supply device 1000 through discharge switch DS. In a discharging mode of power supply device 1000, power-supply controller 84 switches on discharge switch DS to connect power supply device 1000 to loads LD. Consequently, power supply device 1000 supplies electrical energy to loads LD. A switching element, such as a field-effect transistor (FET), may be used as discharge switch DS. Power-supply controller 84 of power supply device 1000 switches on or off discharge switch DS. Power-supply controller 84 includes a communication interface to communicate with an external device. In an example in FIG. 12, the power-supply controller is connected with host device HT, according to conventional communication protocols, such as a universal asynchronous receiver/transmitter (UART), and Recommended Standard 232C (RS-232C). A user interface that allows a user to operate the power supply system may be provided, as necessary.

Each of battery packs 81 includes signal terminals and power-source terminals. The signal terminals include pack input/output terminal DI, terminal-that-outputs-pack-failure DA, and pack connection terminal DO. Pack input/output terminal DI is used to input or output signals from other pack batteries or power-supply controller 84. Pack connection terminal DO is used to input, into battery pack 81, signals from other pack batteries that are subsidiary packs, or is used to output signals from battery pack 81 to other pack batteries that are subsidiary packs. Terminal-that-outputs-pack-failure DA is used to output a failure of the pack battery to an outside. The power-source terminals are used to connect battery packs 81 with each other in series or parallel. Battery units 82 are connected to output line OL through respective parallel-connection switches 85. Battery units 82 are connected with each other in parallel.

INDUSTRIAL APPLICABILITY

A power supply device, and a vehicle and an electricity storage device that are equipped with the power supply device according to an aspect of the present invention, and separators for the power supply device are appropriately used for plug-in hybrid electric vehicles and hybrid electric vehicles that switch between an electric vehicle (EV) drive mode and a hybrid electric vehicle (HEV) drive mode, and electric vehicles. The power supply device according to an aspect of the present invention is appropriately used for an uninterruptible power supply device that is mountable on a rack of a computer sever. Alternatively, the power supply device according to an aspect of the present invention is appropriately used for an uninterruptible power supply device used for a wireless base station for cellular phones. Alternatively, the power supply device according to an aspect of the present invention is appropriately used for a power supply for electricity storage for household use or factory use. Alternatively, the power supply device according to an aspect of the present invention is appropriately used for an electricity storage device combined with solar cells, such as a power supply for a street light. Alternatively, the power supply device according to an aspect of the present invention is appropriately used for an uninterruptible power supply for traffic signals.

The invention claimed is:

1. A power supply device comprising:
a battery stack body that includes a plurality of secondary battery cells that are stacked;
a pair of end plates disposed on both end surfaces of the battery stack body, respectively; and
binding bars that are disposed on side surfaces of the battery stack body, respectively, and bind the pair of end plates,
wherein each of the binding bars includes engaging steps that are opposite the pair of end plates, respectively, and each of the engaging steps extends in a direction intersecting with a stack direction of the battery stack body,
each of the pair of end plates includes engaging protrusions that are opposite the binding bars, respectively, and the engaging protrusions are configured to engage with the engaging steps such that each of the pair of end plates are engaged to each of the binding bars, respectively in a single predetermined location;
wherein each of the binding bars includes a pair of reinforcing members that are disposed on a binding bar main surface which is opposite the battery stack body, and the pair of reinforcing members protrude toward the end plates, and respectively include the engaging steps that engage with the engaging protrusions,
wherein binding bar fixing bolts are inserted through the reinforcing members to fix the end plates on a side surface of each of the binding bars;
wherein each of the binding bars includes a plurality of binding bar bolt holes, the binding bar bolt holes are used to insert the binding bar fixing bolts into the engaging steps, and the binding bar bolt holes are arranged in the direction intersecting with the stack direction of the battery stack body, and
each of the end plates includes a plurality of end plate bolt holes, the end plate bolt holes are used to insert the binding bar fixing bolts into the engaging protrusions, and the end plate bolt holes are arranged in the direction intersecting with the stack direction of the battery stack body; and
wherein the binding bar bolt holes or the end plate bolt holes are formed as elongated circular shaped holes that are long in the stack direction of the battery stack body.

2. The power supply device according to claim 1, wherein each of the binding bars includes a metal plate and a pair of metal blocks, and each of the pair of metal blocks has a dimension in the direction intersecting with the stack direction of the battery stack body that is larger than a dimension of the metal plate in the direction intersecting with the stack direction of the battery stack body,
the pair of metal blocks are the pair of reinforcing members, and the pair of metal blocks and the metal plate are integrally formed, and
the pair of metal blocks are disposed on an inner main surface of the metal plate, the pair of metal blocks overlapping the battery stack body when viewed in the stack direction of the battery stack body.

3. The power supply device according to claim 1, wherein fixing structures that screw the binding bars to the end plates are arranged at connection structures between the engaging steps and the engaging protrusions.

4. The power supply device according to claim 1, wherein the binding bar fixing bolts are stepped bolts that each have a step that corresponds to a thickness of the reinforcing members.

5. The power supply device according to claim 1, wherein each of the reinforcing members includes a reinforcing member recess, and an inner wall of the reinforcing member recess forms each of the engaging steps.

6. The power supply device according to claim 5, wherein in a state where the engaging protrusions are inserted in the engaging steps, gaps are formed on both sides of a portion where the engaging steps are in contact with the engaging protrusions.

7. The power supply device according to claim 1, wherein edges, at opposed ends in the stacking direction of the battery stack body, of each of the binding bars are not bent and a cross section of each of the edges does not have an L shape.

8. The power supply device according to claim 1, wherein an insulating sheet is interposed between each of the binding bars and the battery stack body.

9. The power supply device according to claim 1, wherein the power supply device is used to drive a vehicle.

10. A vehicle equipped with the power supply device according to claim 1, the vehicle comprising:
the power supply device:
a motor for traction to which the power supply device supplies electrical energy;
a vehicle body to which the power supply device and the motor are mounted; and
wheels driven by the motor to allow the vehicle body to travel.

11. An electricity storage device equipped with the power supply device according to claim 1, the electricity storage device comprising:
the power supply device; and
a power-supply controller that controls charging and discharging of the power supply device,
wherein the power-supply controller allows electrical energy from an outside to be used to charge the secondary battery cells, and charges the secondary battery cells.

12. A power supply device comprising:
a battery stack body that includes a plurality of secondary battery cells that are stacked;
a pair of end plates disposed on both end surfaces of the battery stack body, respectively; and
binding bars that are disposed on side surfaces of the battery stack body, respectively, and bind the pair of end plates, wherein each of the binding bars includes engaging steps that are opposite the pair of end plates, respectively, and each of the engaging steps extends in a direction intersecting with a stack direction of the battery stack body, each of the pair of end plates includes engaging protrusions that are opposite the binding bars, respectively, and the engaging protrusions are configured to engage with the engaging steps such that each of the pair of end plates are engaged to each of the binding bars, respectively in a single predetermined location;

wherein each of the binding bars includes a pair of reinforcing members that are disposed on a binding bar main surface which is opposite the battery stack body, and the pair of reinforcing members protrude toward the end plates, and respectively include the engaging steps that engage with the engaging protrusions, wherein binding bar fixing bolts are inserted through the reinforcing members to fix the end plates on a side surface of each of the binding bars; and wherein edges, at opposed ends in the stacking direction of the battery stack body, of each of the binding bars are not bent and a cross section of each of the edges does not have an L shape.

13. The power supply device according to claim 12, wherein
each of the binding bars includes a metal plate and a pair of metal blocks, and each of the pair of metal blocks has a dimension in the direction intersecting with the stack direction of the battery stack body that is larger than a dimension of the metal plate in the direction intersecting with the stack direction of the battery stack body,
the pair of metal blocks are the pair of reinforcing members, and the pair of metal blocks and the metal plate are integrally formed, and
the pair of metal blocks are disposed on an inner main surface of the metal plate, the pair of metal blocks overlapping the battery stack body when viewed in the stack direction of the battery stack body.

14. The power supply device according to claim 12, wherein fixing structures that screw the binding bars to the end plates are arranged at connection structures between the engaging steps and the engaging protrusions.

15. The power supply device according to claim 12,
wherein binding bar fixing bolts are inserted through the reinforcing members to fix the end plates on a side surface of each of the binding bars,
wherein each of the binding bars includes a plurality of binding bar bolt holes, the binding bar bolt holes are used to insert the binding bar fixing bolts into the engaging steps, and the binding bar bolt holes are arranged in the direction intersecting with the stack direction of the battery stack body, and
each of the end plates includes a plurality of end plate bolt holes, the end plate bolt holes are used to insert the binding bar fixing bolts into the engaging protrusions, and the end plate bolt holes are arranged in the direction intersecting with the stack direction of the battery stack body.

16. The power supply device according to claim 15, wherein the binding bar fixing bolts are stepped bolts that each have a step that corresponds to a thickness of the reinforcing members.

17. The power supply device according to claim 15, wherein each of the reinforcing members includes a reinforcing member recess, and an inner wall of the reinforcing member recess forms each of the engaging steps.

18. The power supply device according to claim 17, wherein in a state where the engaging protrusions are inserted in the engaging steps, gaps are formed on both sides of a portion where the engaging steps are in contact with the engaging protrusions.

19. The power supply device according to claim 12, wherein an insulating sheet is interposed between each of the binding bars and the battery stack body.

20. The power supply device according to claim 12, wherein the power supply device is used to drive a vehicle.

21. A vehicle equipped with the power supply device according to claim 12, the vehicle comprising:
the power supply device:
a motor for traction to which the power supply device supplies electrical energy;
a vehicle body to which the power supply device and the motor are mounted; and
wheels driven by the motor to allow the vehicle body to travel.

22. An electricity storage device equipped with the power supply device according to claim 12, the electricity storage device comprising:
the power supply device; and
a power-supply controller that controls charging and discharging of the power supply device,
wherein the power-supply controller allows electrical energy from an outside to be used to charge the secondary battery cells, and charges the secondary battery cells.

* * * * *